US010744858B2

(12) United States Patent
Olivares et al.

(10) Patent No.: US 10,744,858 B2
(45) Date of Patent: Aug. 18, 2020

(54) VEHICLE BODY STRUCTURE

(71) Applicant: Nissan North America, Inc., Franklin, TN (US)

(72) Inventors: Carlos Alberto Castro Olivares, Estado de Mexico (MX); Amilkar Abraham Soto Infante, Estado de Mexico (MX)

(73) Assignee: Nissan North America, Inc., Franklin, TN (US)

( * ) Notice: Subject to any disclaimer, the term of this patent is extended or adjusted under 35 U.S.C. 154(b) by 450 days.

(21) Appl. No.: 15/281,231

(22) Filed: Sep. 30, 2016

(65) Prior Publication Data

US 2018/0093552 A1    Apr. 5, 2018

(51) Int. Cl.
    *B60H 3/06*      (2006.01)
    *B60H 1/24*      (2006.01)

(52) U.S. Cl.
    CPC ........... *B60H 3/0616* (2013.01); *B60H 1/243* (2013.01); *B60H 1/248* (2013.01); *B60H 2003/065* (2013.01)

(58) Field of Classification Search
CPC ........... B60R 7/00; B60R 21/02; B60R 21/12; B62D 27/00; B60N 2/24; B01D 46/42; B01D 46/52; B01D 46/10; A47C 16/00; F24F 7/013; F24F 13/00; F24F 13/28; H05K 5/00; B60H 3/0616; B60H 1/243; B60H 1/248
USPC ........ 224/282, 400; 296/24.4; 454/184, 137, 454/354, 289, 290, 158; 5/648; 52/716.6; 55/422
See application file for complete search history.

(56) References Cited

U.S. PATENT DOCUMENTS

| | | | | | |
|---|---|---|---|---|---|
| 1,559,376 | A | * | 10/1925 | Riker | F24F 13/18 |
| | | | | | 454/195 |
| 1,694,089 | A | * | 12/1928 | Wright | F24F 13/28 |
| | | | | | 261/104 |
| 2,575,499 | A | * | 11/1951 | Manow | B01D 46/10 |
| | | | | | 454/284 |

(Continued)

FOREIGN PATENT DOCUMENTS

| DE | 102010053758 A1 | 6/2012 |
|---|---|---|
| EP | 2463009 A1 | 6/2012 |

(Continued)

*Primary Examiner* — Edelmira Bosques
*Assistant Examiner* — Phillip Decker
(74) *Attorney, Agent, or Firm* — Global IP Counselors, LLP

(57) ABSTRACT

A vehicle body structure includes a wall and a removable panel. The wall has a first surface and a second surface opposite the first surface. The wall defines a vent opening with a peripheral edge extending between the first surface and the second surface. The wall includes an air vent structure open to the vent opening. The removable panel has a trim surface and an attachment surface with a plurality of air vent slots extending from the attachment surface to the trim surface. The attachment surface has a retaining structure configured to retain an air filter along the attachment surface and an attachment structure configured to attach to the wall covering the vent opening with the retaining structure extending at least partially within the air vent structure.

16 Claims, 7 Drawing Sheets

(56) References Cited

U.S. PATENT DOCUMENTS

| | | | | |
|---|---|---|---|---|
| 3,165,053 A * | 1/1965 | Christie | F24F 1/04 | 454/202 |
| 3,397,005 A * | 8/1968 | May | B60R 21/12 | 296/24.46 |
| 3,815,638 A * | 6/1974 | Martin | F16L 25/0009 | 138/103 |
| 4,483,413 A * | 11/1984 | Ohashi | B60H 1/00021 | 181/224 |
| 4,520,715 A * | 6/1985 | Coomes | F24F 13/00 | 454/284 |
| 5,360,463 A * | 11/1994 | Dietterle | B01D 46/0005 | 55/422 |
| 5,472,379 A * | 12/1995 | Andress | B01D 46/0005 | 454/158 |
| 5,472,380 A * | 12/1995 | Sarazen, Jr. | F24F 13/075 | 454/290 |
| 5,511,842 A * | 4/1996 | Dillon | B60N 2/24 | 224/400 |
| 5,588,909 A * | 12/1996 | Ferng | B60H 1/00428 | 454/141 |
| 5,603,476 A | 2/1997 | Merk et al. | | |
| 5,716,270 A * | 2/1998 | Chambers | F24F 13/08 | 454/309 |
| 5,792,230 A * | 8/1998 | Moore | B01D 46/0004 | 454/290 |
| 6,066,044 A * | 5/2000 | Orendorff | F24F 13/082 | 454/290 |
| 6,174,343 B1 * | 1/2001 | Bloomer | B01D 46/0002 | 123/198 E |
| 6,217,439 B1 * | 4/2001 | Janeling | B60H 3/0641 | 454/158 |
| 6,227,962 B1 * | 5/2001 | Orendorff | F24F 13/082 | 454/289 |
| 6,454,826 B2 * | 9/2002 | Fath | B01D 46/10 | 55/490 |
| 6,652,375 B2 * | 11/2003 | Donnelly | F24F 13/072 | 454/289 |
| 6,692,347 B1 * | 2/2004 | Schneider | B60H 3/0641 | 454/158 |
| 6,808,547 B2 * | 10/2004 | Ota | B01D 46/0006 | 55/478 |
| 6,832,951 B2 * | 12/2004 | Orendorff | F24F 13/12 | 454/290 |
| 6,866,578 B2 * | 3/2005 | Orendorff | F24F 13/082 | 137/625.48 |
| 7,097,558 B2 * | 8/2006 | Berger | F24F 13/084 | 454/289 |
| 7,566,263 B2 * | 7/2009 | Snyder | E04F 17/04 | 454/284 |
| 8,474,214 B2 * | 7/2013 | Dawe | F16B 5/0664 | 24/289 |
| 9,039,500 B2 * | 5/2015 | Pfannenberg | F04D 29/646 | 454/184 |
| 9,796,245 B2 * | 10/2017 | Switzer | B60H 1/248 | |
| 9,932,941 B2 * | 4/2018 | Khami | B01D 46/0005 | |
| 10,247,147 B2 * | 4/2019 | Schmid | F02M 35/02416 | |
| 2002/0022450 A1 * | 2/2002 | Berger | F24F 13/02 | 454/290 |
| 2005/0242603 A1 * | 11/2005 | Holderle | B60K 11/04 | 296/1.08 |
| 2007/0287374 A1 * | 12/2007 | Day | B60H 3/0616 | 454/158 |
| 2008/0146136 A1 * | 6/2008 | Degutis | B61D 17/16 | 454/83 |
| 2008/0276375 A1 * | 11/2008 | Gehrke | A47C 20/021 | 5/648 |
| 2009/0001112 A1 * | 1/2009 | Chou | B60R 7/06 | 224/282 |
| 2009/0230589 A1 * | 9/2009 | Rossi | B29C 43/021 | 264/292 |
| 2009/0261619 A1 * | 10/2009 | Wurfel | B62D 35/005 | 296/180.1 |
| 2011/0127804 A1 * | 6/2011 | Moenter | B60R 13/0231 | 296/214 |
| 2012/0240540 A1 * | 9/2012 | Metzger | F02M 35/0203 | 55/493 |
| 2012/0329381 A1 * | 12/2012 | Liao | F24F 7/013 | 454/354 |
| 2013/0194818 A1 * | 8/2013 | Gomez | F21S 45/49 | 362/547 |
| 2013/0203333 A1 * | 8/2013 | Amura | B60H 1/00378 | 454/137 |
| 2014/0141708 A1 * | 5/2014 | Baker | F04D 19/002 | 454/249 |
| 2015/0017897 A1 * | 1/2015 | Wiliams | E04H 1/1205 | 454/51 |
| 2015/0101296 A1 * | 4/2015 | Ferreira | B01D 46/10 | 55/496 |
| 2015/0260427 A1 * | 9/2015 | Snyder | F24F 13/085 | 454/289 |
| 2016/0268659 A1 * | 9/2016 | Nagamine | H01M 10/625 | |
| 2018/0326819 A1 * | 11/2018 | Abts | B60H 1/00364 | |
| 2018/0347518 A1 * | 12/2018 | Martin | F02M 35/02441 | |

FOREIGN PATENT DOCUMENTS

| | | | |
|---|---|---|---|
| KR | 1020090009589 A * | 1/2009 | |
| WO | 2015-086661 A1 | 6/2015 | |

* cited by examiner

VEHICLE BODY STRUCTURE

BACKGROUND

Field of the Invention

The present invention generally relates to a vehicle body structure for an air conditioning system. More specifically, the present invention relates to vehicle body structure that includes a removable trim panel configured to retain an air filter of the air conditioning system.

Background Information

A commercial vehicle, such as a taxi, is in almost constant use. It is therefore advantageous for routine maintenance procedures to be simple and quick to perform.

SUMMARY

On object of the present disclosure is to provide an air conditioning system of a commercial vehicle with a structure that provide for simple and rapid air filter replacement.

Another object of the present disclosure is to provide a vehicle body structure with a trim panel that has multiple functions, including serving as an air vent and having an air filter retention structure.

In view of the state of the known technology, one aspect of the present disclosure is to provide a vehicle body structure with a wall and a removable panel. The wall has a first surface and a second surface opposite the first surface. The wall defines a vent opening with a peripheral edge extending between the first surface and the second surface. The wall includes an air vent structure open to the vent opening. The removable panel has a trim surface and an attachment surface with a plurality of air vent slots extending from the attachment surface to the trim surface. The attachment surface has a retaining structure configured to retain an air filter along the attachment surface and an attachment structure configured to attach to the wall covering the vent opening with the retaining structure extending at least partially within the air vent structure.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
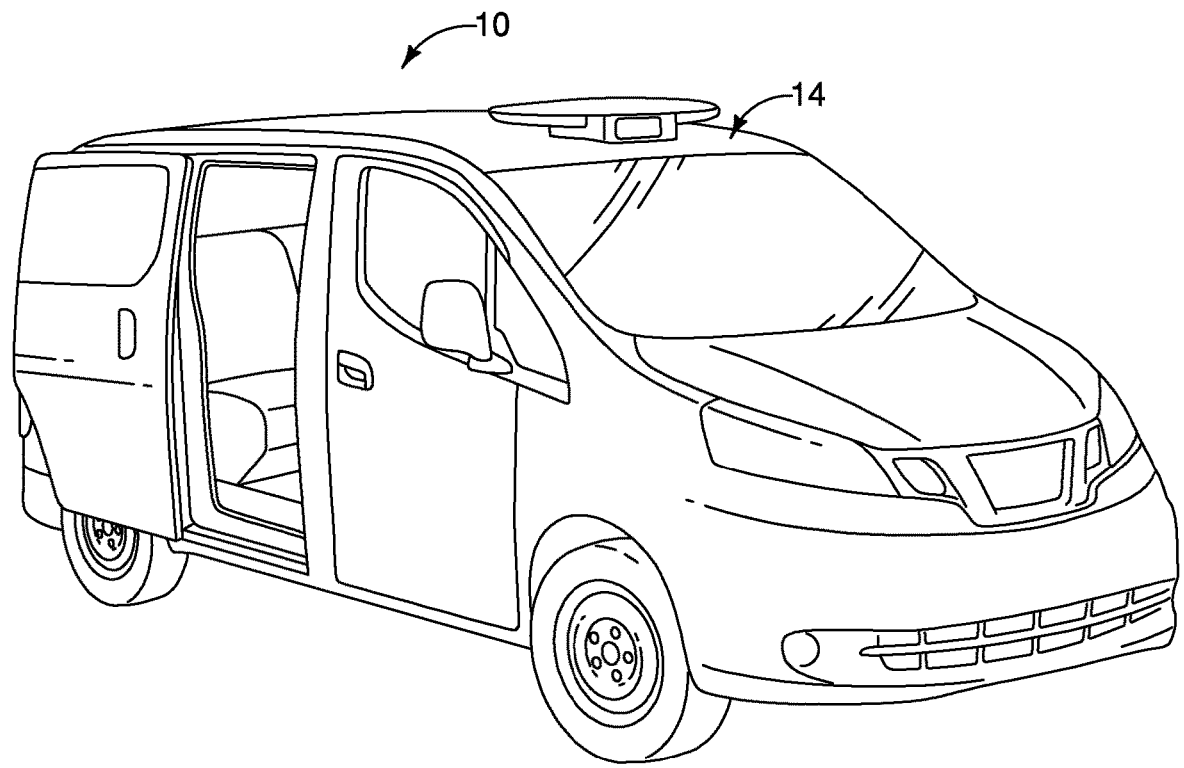
FIG. 1 is a top perspective view of a vehicle having a passenger compartment divided into a first zone and a second zone, and a dual zone air conditioning system in accordance with a first embodiment.
Figure 2:
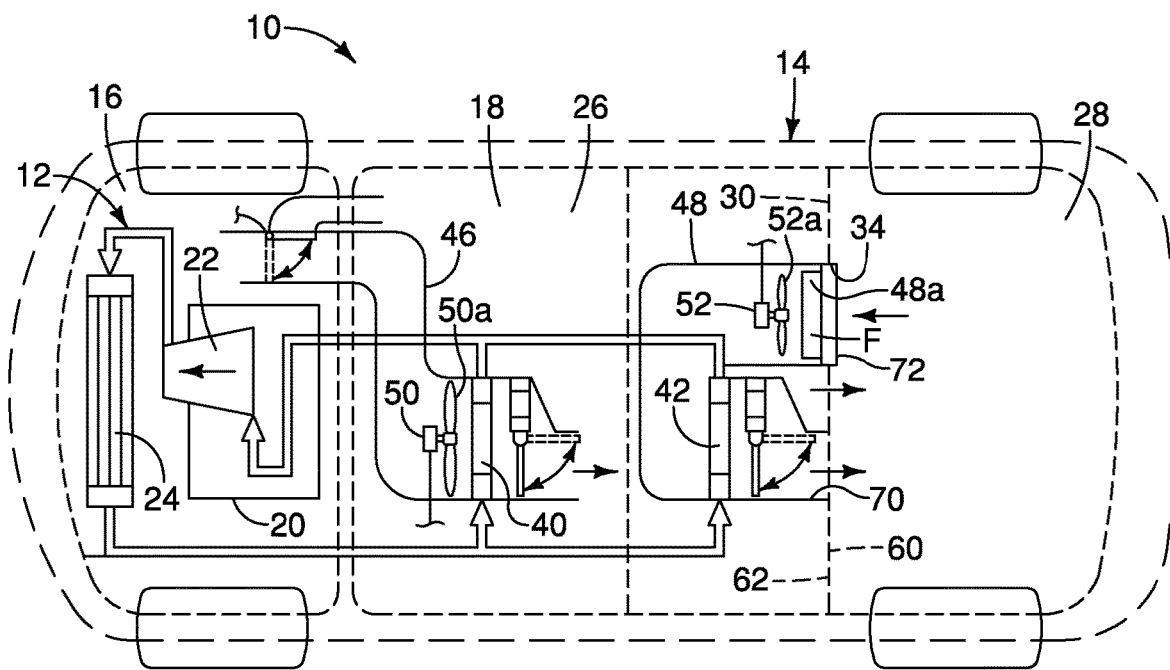
FIG. 2 is a schematic view of the vehicle showing an engine compartment, the first zone of the passenger compartment, the second zone of the passenger compartment, a wall that divides the first zone from the second zone, and elements of the air conditioning system in accordance with the first embodiment.

Referring initially to FIGS. 1 and 2, a vehicle 10 with an air conditioning system 12 (FIG. 2) with independently operable dual zones is illustrated in accordance with a first embodiment. As is described in greater detail below, the air conditioning system 12 of the vehicle 10 is provided with an air filter F (FIGS. 3-4) that is easily replaced.

As shown in FIG. 2, the vehicle 10 includes a vehicle body structure 14 that defines an engine compartment 16 and a passenger compartment 18. The engine compartment 16 includes a power plant 20, a compressor 22 powered by the power plant 20 and a condenser 24. The power plant 20 can be an electric motor, an internal combustion engine, such as a diesel engine or gasoline powered engine, or a hybrid engine that includes both an electric motor and an internal combustion engine. Since such power plants are conventional features, further description is omitted for the sake of brevity. The compressor 22 and the condenser 24 are part of the air conditioning system 12, which is described in greater detail below.

The passenger compartment 18 is divided into a first zone 26 and a second zone 28 by, for example, a partition or wall 30. The first zone 26 is a forward section of the passenger compartment 18 that includes a front seat or seats (not shown) and operator controls (not shown) such as a steering wheel (not shown), brake and accelerator controls. Since front seat(s) and operator controls of a vehicle are conventional features, further description is omitted for the sake of brevity. The second zone 28 is a passenger section of the passenger compartment 18 rearward from the first zone 26. The passenger compartment 18 is configured for use as, for example, a taxi or limousine where a driver is separated from passengers, where the wall 30 separates the first zone 26 from the second zone 28. Alternatively, the passenger compartment 18 can be conventional vehicle passenger compartment, where the conventional vehicle includes a dual zone air conditioning such as the air conditioning system 12, as described below.

The air conditioning system 12 is shown in FIG. 2 and includes the compressor 22, the condenser 24, a first evaporator 40 (for the first zone 26), a second evaporator 42 (the second zone 28), a first air handler 46 (the first zone 26), a second air handler 48 (the second zone 28), a blower motor 50 that includes a first fan 50a and a blower motor 52a that includes a second fan 52a. It should he understood from the drawings and the description herein that the air conditioning system 12 can include additional conventional elements, such as temperature sensors and expansion valves. However, since such features are conventional components, further description is omitted for the sake of brevity.

As shown in FIG. 2, the compressor 22 is located in the engine compartment 16 and is provided with power by the power plant 20 in a conventional manner. The compressor 22 is configured to compress refrigerant received from a downstream side of the first evaporator 40 and a downstream side of the second evaporator 42. The compressor 22 is connected to the condenser 24 provide compressed refrigerant to the condenser 24. The condenser 24 is installed within the engine compartment 16 in order to dissipate heat produced by the compressing of refrigerant by the compressor 22.

Figure 3:
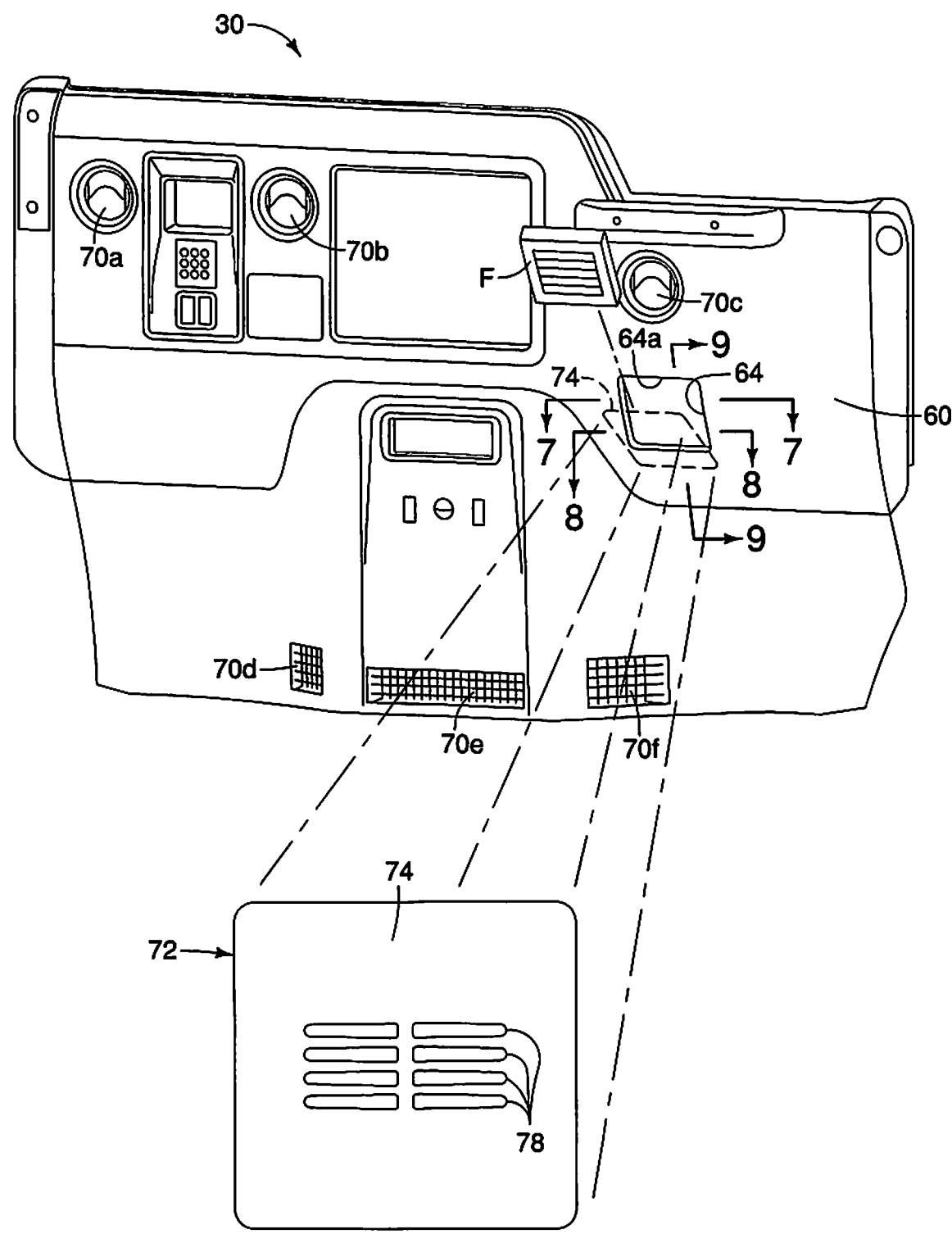
FIG. 3 is an exploded perspective of the wall that divides the front zone from the rear zone, the wall having a vent opening with a removable trim panel in accordance with the first embodiment.

A description of the wall 30 and the second air handler 48 is now provided with specific reference to FIGS. 2 and 3.

The wall 30 includes at least a first surface 60 and a second surface 62 opposite the first surface 60. In the depicted embodiment, the first surface 60 is a finished surface that can include a trim finish that coordinates with the overall appearance of the passenger compartment 18 of the vehicle 10. The second surface 62 is a hidden, concealed surface that is hidden within the overall structure of the wall 30. The wall 30 defines a vent opening 64 with a peripheral edge 64a (also referred to as a lip 64a) that extends between the first surface 60 and the second surface 62. The second air handler 48 is an air vent structure that is disposed within the wall 30 such that the vent opening 64 leads to the second air handler 48. In other words, the vent opening 64 coincides with an air inlet of the second air handler 48.

In the first embodiment, the second air handler 48 is a single housing hawing an air inlet 48a that coincides with the vent opening 64 and at least one air outlet 70 shown in FIG. 2. In FIG. 3 the air outlet 70 is defined by a series of vent openings 70a, 70b, 70c, 70d, 70e and 70f that are all connected to the air outlet 70 providing conditioned air to the second zone 28. In the first embodiment, the second air handler 48 is configured to constantly operate in a recirculation mode. Specifically, with the blower motor 52 (the second fan 52a) operating, air is continuously drawn from the second zone 28 into the second air handler 48, through the second evaporator 42 and back into the second zone 28. It should be understood from the drawings and the description herein that since the vehicle 10 is a commercial taxi, a window (not shown) in an upper portion of the wall 30 allows air to pass between the first zone 26 and the second zone 28. Therefore, the air in the second zone 28 is unlikely to become stale. However, since the air from the second zone 28 is being recirculated, a filter F is provided to cleanse the air passing back into the second, air handler 48, as is described in greater detail below.

The vent opening 64 of the wall 30 is dimensioned and shaped to receive a removable panel 72. The removable panel 72 is configured to retain the filter F such that the filter F is easily replaced by removing the panel 72 from the wall 30.

A description of the removable panel 72 is now provided with specific reference to FIGS. 4-9. The removable panel 72 has a trim surface 74 and an attachment surface 76 with a plurality of air vent slots 78 extending from the attachment surface 76 to the trim surface 74. The trim surface 74 is designed to conform to the appearance of the first surface 60 of the wall 30.

Figure 4:
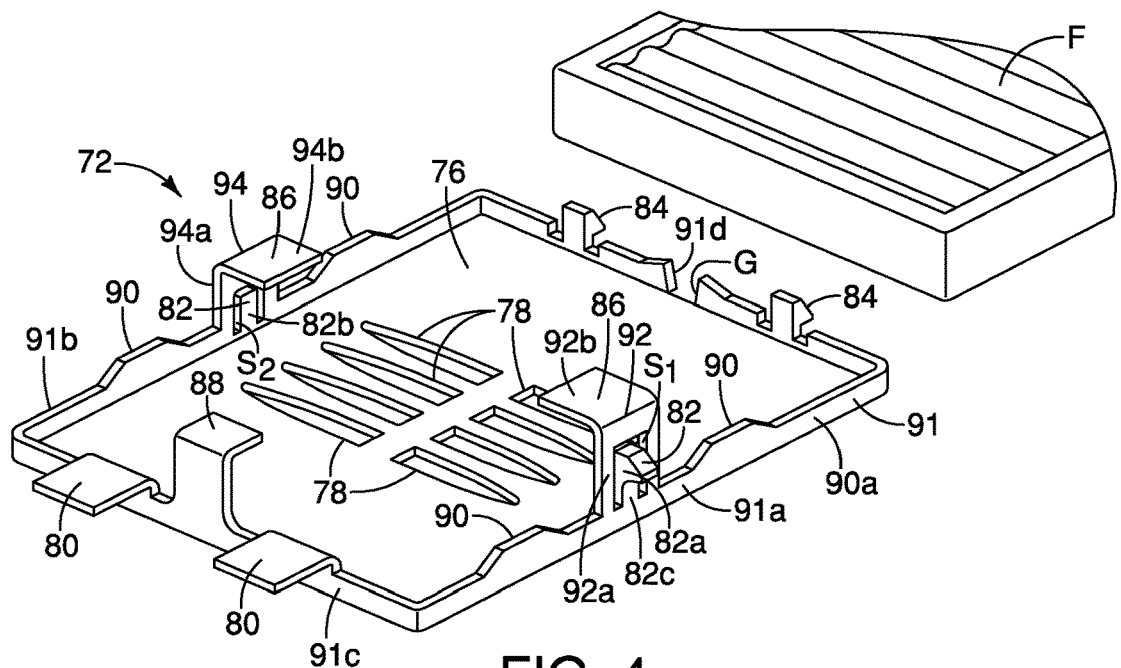
FIG. 4 is a perspective view of the removable trim panel removed from the wall, showing details of the filter retaining structure and the attachment structures in accordance with the first embodiment.
Figure 5:
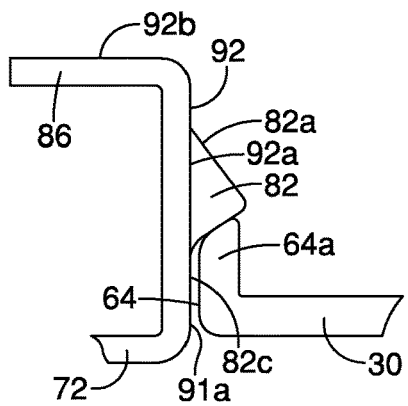
FIG. 5 is a side view of a portion of the wall and a portion of the trim panel showing details of one of the filter retaining structures and the attachment structures in accordance with the first embodiment.
Figure 9:
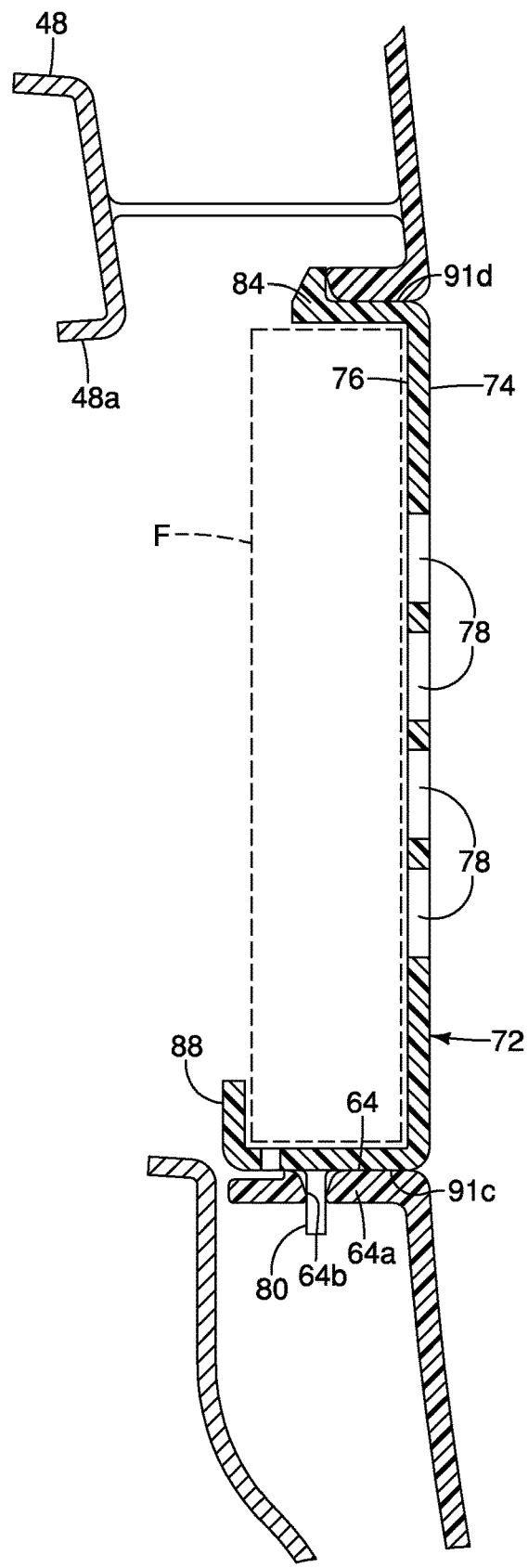
FIG. 9 is yet another cross-sectional view of a portion of the wall and the trim panel taken along the line 9-9 in FIG. 3 showing further details of the trim panel and the wall in accordance with the first embodiment.

As shown in FIG. 4, the attachment surface 76 includes projections 80, attachment structures 82 and 84, filter retaining structures 86 and 88 and positioning protrusions 90. As shown in FIG. 9, the projections 80 extend away from the attachment surface 76 in a direction that is parallel to the attachment surface 76. The projections 80 are configured for insertion into slots 64b formed in a lower area of the peripheral edge 64a of the vent opening 64, as shown in FIG. 9. The attachment structure 82 includes a first snap-fitting projection 82a and a second snap-fitting projection 82b. The first snap-fitting projection 82a includes a main surface 82c. The second snap-fitting projection 82b includes a main surface 82d. The attachment structures 82 and 84 are snap-fitting projections that are located and positioned to engage the peripheral edge 64a at differing locations in order to retain the removable panel 72 within the vent opening 64 of the wall 30, as shown in FIGS. 7 and 9.

Figure 7:
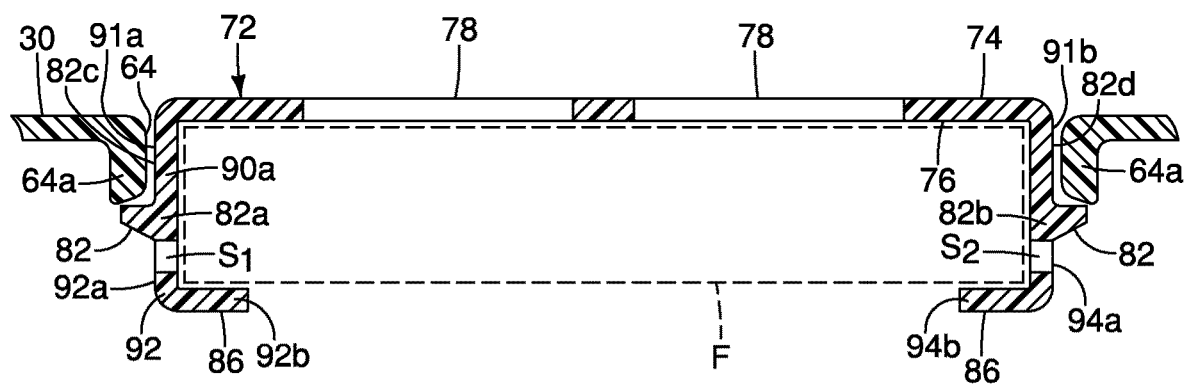
FIG. 7 is a cross-sectional view of a portion of the wall and the trim panel taken along the line 7-7 in FIG. 3 showing a filter retaining structure and attachment structures in accordance with the first embodiment.
Figure 8:
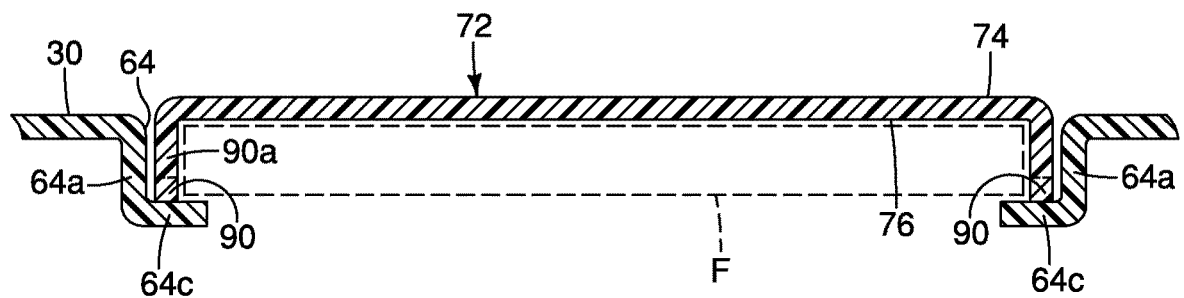
FIG. 8 is another cross-sectional view of a portion of the wall and the trim panel taken along the line 8-8 in FIG. 3 showing a movement limiting flange of the wall in accordance with the first embodiment.

The removable panel 72 includes an outer peripheral edge flange or lip 90a that extends around the attachment surface 76, and is perpendicular to the attachment surface 76, as shown in FIGS. 4, 7 and 8. The positioning protrusions 90 (convex portions) extend from the lip 90a (also referred to as the outer peripheral edge flange 90a) formed around the outer periphery of the attachment surface 76 and are dimensioned and located to contact an extension 64c of the peripheral edge 64a of the wall 30, as shown in FIG. 8. The positioning protrusions 90 are provided in order to assure that the trim surface 74 of the removable panel 72 aligns and/or is flush with the first surface 60 of the wall with the removable panel 72 installed to the vent opening 64 of the wall 30. The outer peripheral edge flange 90a defines an outermost outer peripheral surface 91 of the removable panel 72. The outer peripheral surface 91 includes a first section 91a, a second section 91b, a third section 91c and a fourth section 91d. The first section 91a, the second section 91b and the third section 91c of the outer peripheral surface 91 are connected to one another thereby surrounding the attachment surface 76 along three sides thereof, as shown in FIG. 4. The fourth section 91d is connected to the first and second sections 91a and 91b, but can include a gap G, as shown in FIG. 4. Consequently, the outer peripheral edge flange 90a extends completely around the attachment surface 76, except for the gap G.

Figure 6:
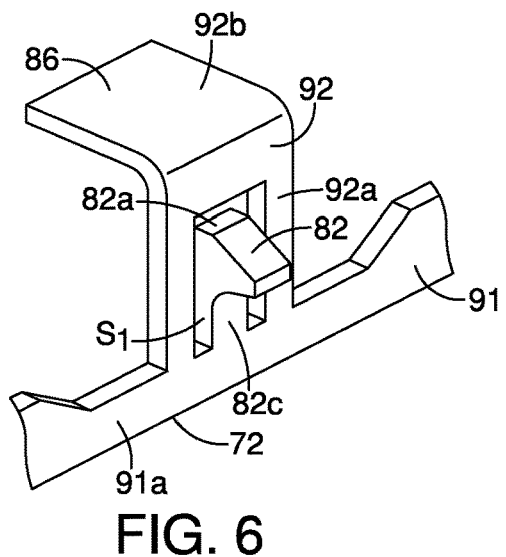
FIG. 6 is a perspective view of the portion of the wall and a portion of the trim panel depicted in FIG. 5 showing details of one of the filter retaining structures and the attachment structures in accordance with the first embodiment.

The filter retaining structure 86 and 88 are hook-like protrusions that are configured to retain the air filter F along the attachment surface 76 of the removable panel 72. As shown in FIG. 4, the filter retaining structure 86 includes a first hook-shaped protrusion 92 and a second hook-shaped protrusion 94 that are spaced apart from the pair of projections 80. The first and second hook-shaped protrusion 92 and 94 extend from the outer peripheral edge flange 90a away from the attachment surface 76 of the removable panel 72. The first hook-shaped protrusion 92 has a main surface 92a that extend from and is co-planar with the first section 91a of the outer peripheral surface 91. The second hook-shaped protrusion 94 having a main surface 94a that extends from and is co-planar with the second section 91b of the outer peripheral surface 91. The first hook-shaped protrusion 92 and the second hook-shaped protrusion 94 face one another and are located on opposite sides of the removable panel 72. The first hook-shaped protrusion 92 includes a first retaining projection 92b that extends from a distal end of the main surface 92a in a direction going toward the second hook-shaped protrusion 94 and parallel to the attachment surface 76. Similarly, the second hook-shaped protrusion 94 includes a second retaining projection 94b that extends from a distal end of the main surface 94a in a direction going toward the first hook-shaped protrusion 92 and parallel to the attachment surface 76. As shown in FIGS. 4, 6 and 7, the first hook-shaped protrusion 92 includes a first inverted U-shaped slot $S_1$. The first snap-fitting projection 82a is formed within the first inverted U-shaped slot $S_1$. Similarly as shown in FIGS. 4 and 7, the second hook-shaped protrusion 94 includes a second inverted U-shaped slot $S_2$. The second snap-fitting projection 82b is formed within the second inverted U-shaped slot $S_2$. Further, the main surface of 92a of the first hook-shaped protrusion 92 and the main surface 82c of the first snap-fitting projection 82a both extend from the first section 91a of the outer peripheral surface 91, and are co-planar with the first section 91a of the outer peripheral surface 91. Similarly, the main surface of 94a of the second hook-shaped protrusion 92 and the main surface 82d of the second snap-fitting projection 82b both extend from the second section 91b of the outer peripheral surface 91, and are co-planar with the second section 91b of the outer peripheral surface 91. The filter retaining structures 86 and 88 are arranged to contact and retain the air filter F along three sides of the air filter F (bottom and two lateral sides thereof). Consequently, as indicated in FIG. 3, when an upper end of the removable panel 72 is pulled away from the wall 30, the air filter F can be easily pulled upward and removed from the removable panel 72, and a new filter installed in its place.

In the first embodiment shown in FIGS. 4-9, the attachment structures 82 and the filter retaining structures 86 are integrally formed as single monolithic elements. For example, the attachment structures 82 and the filter retaining structures 86 are molded with the removable panel 72 as a single element or single structure. In other words, the attachment structures 82 each include a snap-fitting projection dimensioned and positioned to contact the peripheral edge 64a of the vent opening 64 of the wall 30. The snap-fitting projections of the attachment structures 82 are integrally formed along respective portions of the filter retaining structures 86 (hook-shaped protrusions).

When the removable panel 72 is installed to the vent opening 64 of the wall 30, air is drawn in from the second zone 28 through the air vent slots 78 and through the air filter E. Thereafter, the blower motor 52 (and the second fan 52a) draws the air into the second air handler 48, through the second evaporator 42 and out the air outlet 70 (and/or the vent openings 70a, 70b, 70c, 70d, 70e and 70f and back into the second zone 28.

Second Embodiment

Figure 10:
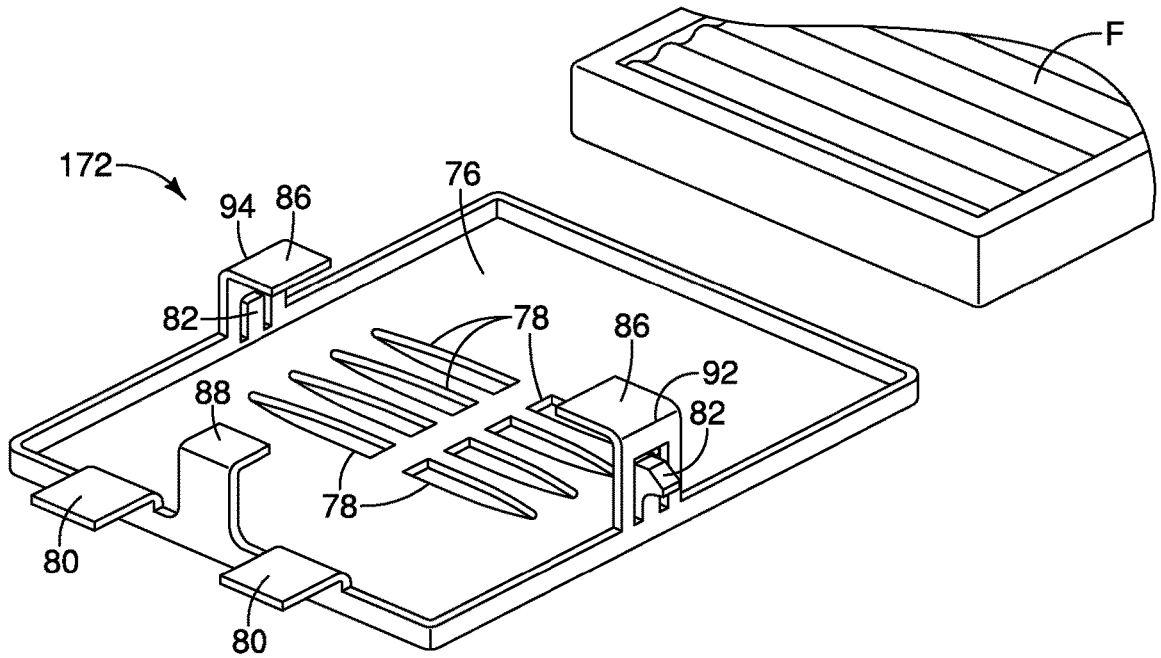
FIG. 10 is a perspective view of a portion of the wall and a portion of a trim panel showing details of filter retaining structures and attachment structures in accordance with a second embodiment.

Referring now to FIG. 10, a removable panel 172 in accordance with a second embodiment will now be explained. In view of the similarity between the first and second embodiments, the parts of the second embodiment that are identical to the parts of the first embodiment will be given the same reference numerals as the parts of the first embodiment. Moreover, the descriptions of the parts of the second embodiment that are identical to the parts of the first embodiment may be omitted for the sake of brevity.

In the second embodiment, the removable panel 172 includes air vent slots 78, the projections 80, the attachment structures 82 and the filter retaining structures 86 and 88, as described above with respect to the first embodiment. Since these features are described above in the first embodiment, further description is omitted for the sake of brevity.

In the second embodiment, the removable panel 172 does not include the attachment structures 84 or the positioning protrusions 90, making the removable panel 172 simpler than the removable panel 72 of the first embodiment, but with all of the benefits of the removable panel 72 of the first embodiment.

Third Embodiment

Figure 11:
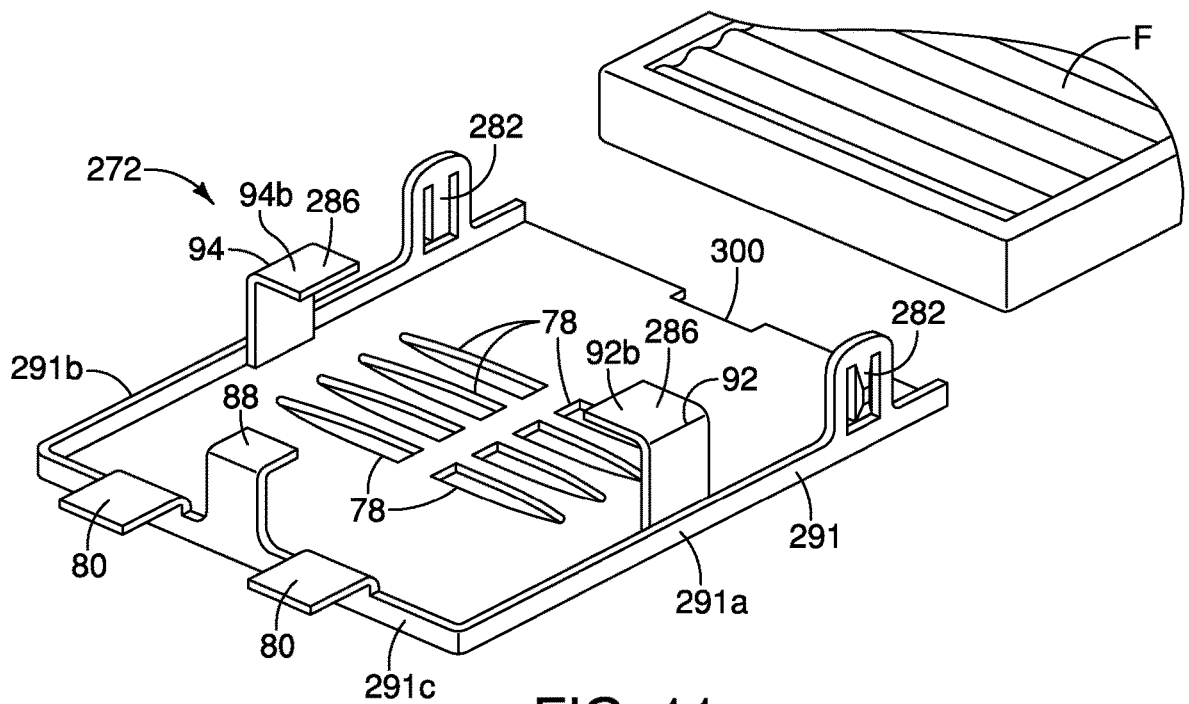
FIG. 11 is a perspective view of a portion of the wall and a portion of a trim panel showing details of filter retaining structures and attachment structures in accordance with a third embodiment.
Figure 12:
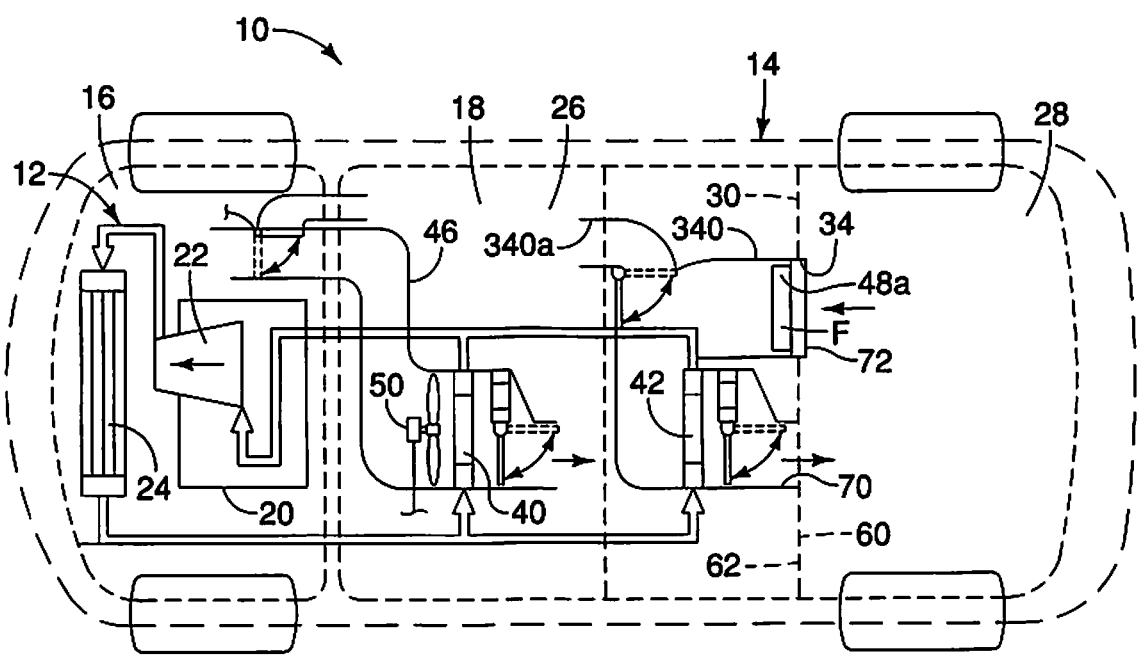
FIG. 12 is a top schematic view of a vehicle showing an engine compartment, the first zone of the passenger compartment, the second zone of the passenger compartment, a wall that divides the first zone from the second zone, and elements of the air conditioning system in accordance with a fourth embodiment.

Referring now to FIG. 11, a removable panel 272 in accordance with a third embodiment will now be explained. In view of the similarity between the first and third embodiments, the parts of the third embodiment that are identical to the parts of the first embodiment will be given the same reference numerals as the parts of the first embodiment. Moreover, the descriptions of the parts of the third embodiment that are identical to the parts of the first embodiment may be omitted for the sake of brevity.

In the third embodiment, the removable panel 272 includes air vent slots 78, the projections 80 and the filter retaining structure 88, as described above with respect to the first embodiment. Since these features are described above in the first embodiment, further description is omitted for the sake of brevity.

However, in the third embodiment, the removable panel 272 includes attachment structures 282 and filter retaining structures 286. The attachment structure 282 are spaced apart from the filter retaining structures 286. More specifically, the attachment structures 282 extend from the attachment surface of the removable panel 272 at locations spaced apart from the filter retaining structures 286. The removable panel 272 also includes a recessed area 300 of an upper edge of the removable panel 272 in order to make removing the removable panel 272 from the wall 30 a simpler process. Specifically, a tool (not shown) can be inserted into the recessed area 300 and used to pull the removable panel 272 from the wall 30.

The various vehicle element and air conditioning elements (other than the wall 30 and the removable panel 72) are conventional components that are well known in the art. Since vehicle and air conditioning element are well known in the art, these structures will not be discussed or illustrated in detail herein. Rather, it will be apparent to those skilled in the art from this disclosure that the components can be any type of structure and/or programming that can be used to carry out the present invention.

General Interpretation of Terms

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Also as used herein to describe the above embodiments, the following directional terms "forward", "rearward", "above", "downward", "vertical", "horizontal", "below" and "transverse" as well as any other similar directional terms refer to those directions of a vehicle equipped with the vehicle body structure. Accordingly, these terms, as utilized to describe the present invention should be interpreted relative to a vehicle equipped with the vehicle body structure.

The term "configured" as used herein to describe a component, section or part of a device includes structure that is constructed to carry out the desired function.

The terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such features. Thus, the foregoing descriptions of the embodiments according to the present invention are provided for illustration only, and not for the purpose of limiting the invention as defined by the appended claims and their equivalents.

What is claimed is:

1. A vehicle body structure, comprising
   a wall having a first surface and a second surface opposite the first surface, the wall defining a vent opening with a peripheral edge extending between the first surface and the second surface, the wall including an air vent structure open to the vent opening, a lower area of the peripheral edge having a pair of slots; and
   a removable panel having a trim surface, an attachment surface and an outer peripheral edge flange that defines an outermost outer peripheral surface of the removable panel, the removable panel defining a plurality of air vent slots extending from the attachment surface to the trim surface, the outer peripheral edge flange and the outer peripheral surface extending in directions that are perpendicular to the attachment surface, the removable panel further having a pair of projections, a retaining structure and an attachment structure, the pair of projections extending away from the attachment surface in a direction parallel to the attachment surface, the pair of projections being parallel to one another and being inserted into the pair of slots in the lower area of the peripheral edge of the vent opening in the wall, the retaining structure being defined by a first hook-shaped protrusion and a second hook-shaped protrusion being spaced apart from the pair of projections and extending from the outer peripheral edge flange away from the attachment surface of the removable panel, the first hook-shaped protrusion having a main surface extending from and being co-planar with a first section of the outer peripheral surface and the second hook-shaped protrusion having a main surface extending from and being co-planar with a second section of the outer peripheral surface, the first hook-shaped protrusion and the second hook-shaped protrusion facing one another and being located on opposite sides of the removable panel, the first hook-shaped protrusion and the second hook-shaped protrusion being configured to retain an air filter along the attachment surface, the attachment structure including a first snap-fitting projection configured to contact the wall with the removable panel covering the vent opening with the retaining structure extending at least partially within the air vent structure.

2. The vehicle body structure according to claim 1, wherein
   the trim surface of the removable panel is flush with the first surface of the wall with the removable panel installed to the wall.

3. The vehicle body structure according to claim 1, wherein
   the attachment structure further includes a second snap-fitting projection dimensioned and positioned to contact the peripheral edge of the vent opening of the wall, the first snap-fitting projection and the second snap-fitting projection being integrally formed along respective ones of the main surfaces of the first and second hook-shaped protrusions.

4. The vehicle body structure according to claim 1, wherein
   the air vent structure includes a blower motor adjacent to the vent opening in the wall such that with the blower motor operating air is drawn in through the air vent slots in the removable panel, through the filter and into the blower motor.

5. The vehicle body structure according to claim 1, further comprising
   a passenger compartment structure that defines a passenger compartment having a first zone and a second zone, the wall separating the first zone from the second zone.

6. The vehicle body structure according to claim 5, further comprising
   an air conditioning system configured to provide conditioned air to the air vent structure in the wall.

7. The vehicle body structure according to claim 1, wherein
   the peripheral edge of the vent opening in the wall includes a lip that defines a stop surface that restricts movement of the removable panel relative to the vent opening.

8. The vehicle body structure according to claim 7, wherein
   the peripheral edge flange of the removable panel includes a plurality of convex portions dimensioned to contact the lip of the peripheral edge of the vent opening in the wall.

9. The vehicle body structure according to claim 1, wherein the outer peripheral edge flange of the removable panel extends around at least three edges of the attachment surface.

10. The vehicle body structure according to claim 1, wherein
the retaining structure is further defined by a third hook-shaped protrusion that includes a main surface extending from and being co-planar with a third section of the outer peripheral surface of the removable panel, the third hook-shaped protrusion being perpendicular to the first and second hook-shaped protrusions.

11. The vehicle body structure according to claim 1, wherein
the first hook-shaped protrusion has a first retaining projection that extends from a distal end of the main surface of the first hook-shaped protrusion in a direction parallel to the attachment surface, and, the second hook-shaped protrusion has a second retaining projection that extends from a distal end of the main surface of the second hook-shaped protrusion in a direction parallel to the attachment surface, the first retaining projection and the second retaining projection extending toward one another such the air filter inserted between the attachment surface and the first and second retaining projections is retained therebetween.

12. A vehicle body structure, comprising
a wall having a first surface and a second surface opposite the first surface, the wall defining a vent opening with a peripheral edge extending between the first surface and the second surface, the wall including an air vent structure open to the vent opening, a lower area of the peripheral edge having a pair of slots; and
a removable panel having a trim surface, an attachment surface and an outer peripheral edge flange that defines an outermost outer peripheral surface of the removable panel, the removable panel defining a plurality of air vent slots extending from the attachment surface to the trim surface, the outer peripheral edge flange and the outer peripheral surface extending in directions that are perpendicular to the attachment surface, the removable panel further having a pair of projections, a retaining structure and an attachment structure, the pair of projections extending away from the attachment surface in a direction parallel to the attachment surface, the pair of projections being parallel to one another and being inserted into the pair of slots in the lower area of the peripheral edge of the vent opening in the wall, the retaining structure being defined by at least two hook-shaped protrusions being spaced apart from the pair of projections and extending from away from the attachment surface of the removable panel and being located on opposite sides of the removable panel, the at least two hook-shaped protrusions being configured to retain an air filter along the attachment surface, the attachment structure including a first snap-fitting projection and a second snap-fitting projection, the first snap-fitting projection having a main surface extending from and being co-planar with a first section of the outer peripheral surface and the second snap-fitting projection having a main surface extending from and being co-planar with a second section of the outer peripheral surface, the first snap-fitting projection and the second snap-fitting projection being located at opposite sides of the attachment surface and configured to contact the wall with the removable panel covering the vent opening with the retaining structure extending at least partially within the air vent structure.

13. The vehicle body structure according to claim 12, where
the at least two hook-shaped protrusions of the retaining structure are defined by a first hook-shaped protrusion and a second hook-shaped protrusion spaced apart from the pair of projections and extending from the outer peripheral edge flange away from the attachment surface of the removable panel, the first hook-shaped protrusion having a main surface extending from and being co-planar with a first section of the outer peripheral surface and the second hook-shaped protrusion having a main surface extending from and being co-planar with a second section of the outer peripheral surface, the first hook-shaped protrusion and the second hook-shaped protrusion facing one another, the main surface of the first hook-shaped protrusion and the main surface of the first snap-fitting projection being co-planar and the main surface of the second hook-shaped protrusion and the main surface of the second snap-fitting projection being co-planar.

14. The vehicle body structure according to claim 13, where
the first hook-shaped protrusion defines a recess adjacent to the first section of the outer peripheral surface with the first hook-shaped protrusion being located within the recess, and the second hook-shaped protrusion defines a recess adjacent to the second section of the outer peripheral surface with the second hook-shaped protrusion being located within the recess.

15. The vehicle body structure according to claim 13, wherein the first hook-shaped protrusion has a first retaining projection that extends from a distal end of the main surface of the first hook-shaped protrusion in a direction parallel to the attachment surface, and, the second hook-shaped protrusion has a second retaining projection that extends from a distal end of the main surface of the second hook-shaped protrusion in a direction parallel to the attachment surface, the first retaining projection and the second retaining projection extending toward one another such the air filter inserted between the attachment surface and the first and second retaining projections is retained therebetween.

16. The vehicle body structure according to claim 12, where
the at least two hook-shaped protrusions of the retaining structure are defined by a first hook-shaped protrusion and a second hook-shaped protrusion spaced apart from the pair of projections, the first hook-shaped protrusion having a main surface extending from the attachment surface of the removable panel adjacent to and spaced apart from the first section of the outer peripheral surface and the first snap-fitting projection and the second hook-shaped protrusion having a main surface extending from the attachment surface of the removable panel adjacent to and spaced apart from the second section of the outer peripheral surface and the second snap-fitting projection.

* * * * *